United States Patent
Hong (10) Patent No.: US 11,284,398 B2
(45) Date of Patent: Mar. 22, 2022

(54) COMMUNICATION LINK CONFIGURATION METHOD AND DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 25 days.

(21) Appl. No.: 16/762,703

(22) PCT Filed: Nov. 14, 2017

(86) PCT No.: PCT/CN2017/110911
§ 371 (c)(1),
(2) Date: May 8, 2020

(87) PCT Pub. No.: WO2019/095105
PCT Pub. Date: May 23, 2019

(65) Prior Publication Data
US 2021/0195574 A1   Jun. 24, 2021

(51) Int. Cl.
*H04W 72/04* (2009.01)
*H04W 24/02* (2009.01)

(52) U.S. Cl.
CPC ......... *H04W 72/048* (2013.01); *H04W 24/02* (2013.01); *H04W 72/0406* (2013.01)

(58) Field of Classification Search
CPC ........... H04W 72/048; H04W 72/0413; H04W 24/10; H04W 56/0005; H04W 8/24; H04W 16/32; H04W 48/16; H04W 76/15
(Continued)

(56) References Cited

U.S. PATENT DOCUMENTS 9,226,136 B2 * 12/2015 Kim ..................... H04W 8/24
9,596,677 B2 *  3/2017 Park ..................... H04L 5/16
(Continued)

FOREIGN PATENT DOCUMENTS

CN       1838816 A    9/2006
CN     101959251 A    1/2011
(Continued)

OTHER PUBLICATIONS

IEEE Standard for Local and Metropolitan Area Networks—Part 20: Air Interface for Mobile Broadband Wireless Access Systems Supporting Vehicular Mobility—Physical and Media Access Control Layer Specification Published in: IEEE Std 802.20-2008 (pp. 1-1039) Aug. 2008 (Year: 2008).*
(Continued)

*Primary Examiner* — William D Cumming
(74) *Attorney, Agent, or Firm* — Finnegan, Henderson, Farabow, Garrett & Dunner, L.L.P.

(57) ABSTRACT

A communication link configuration method includes: sending capability enquiry signaling to a terminal, the capability enquiry signaling being used for querying about a wireless transmission capability of the terminal; receiving capability reporting signaling sent by the terminal, the capability reporting signaling including first information for representing the wireless transmission capability of the terminal; and configuring a corresponding communication link for the terminal according to the first information.

18 Claims, 6 Drawing Sheets

(58) Field of Classification Search
USPC .................. 455/452.1, 450; 370/452.1, 280
See application file for complete search history.

(56) References Cited

U.S. PATENT DOCUMENTS

| | | | |
|---|---|---|---|
| 9,699,690 B2* | 7/2017 | Palm | H04W 48/16 |
| 9,888,478 B2* | 2/2018 | Kim | H04W 72/048 |
| 9,949,269 B2* | 4/2018 | Axmon | H04W 72/0413 |
| 10,015,003 B2* | 7/2018 | Ahn | H04L 5/1461 |
| 10,356,793 B2* | 7/2019 | Kim | H04W 72/0413 |
| 10,405,175 B2* | 9/2019 | Henttonen | H04W 8/245 |
| 10,440,600 B2* | 10/2019 | Bergstrom | H04W 16/32 |
| 10,560,143 B2* | 2/2020 | Zeng | H04W 52/146 |
| 10,897,703 B2* | 1/2021 | Jiang | H04W 8/24 |
| 2014/0213268 A1* | 7/2014 | Sagae | H04L 5/0044 455/450 |
| 2014/0328228 A1* | 11/2014 | Park | H04L 5/0092 370/280 |
| 2015/0271806 A1* | 9/2015 | Kim | H04W 24/10 455/452.1 |
| 2015/0327107 A1 | 11/2015 | Kim et al. | |
| 2016/0234825 A1* | 8/2016 | Axmon | H04W 8/24 |
| 2016/0262053 A1* | 9/2016 | Palm | H04L 5/0092 |
| 2017/0019243 A1* | 1/2017 | Ahn | H04L 5/001 |
| 2017/0238163 A1 | 8/2017 | Chen | |
| 2017/0339554 A1 | 11/2017 | Chen | |
| 2017/0339555 A1* | 11/2017 | Henttonen | H04W 76/15 |
| 2018/0160420 A1* | 6/2018 | Kim | H04W 24/10 |
| 2018/0270686 A1* | 9/2018 | Bergstrom | H04W 16/32 |
| 2019/0081657 A1* | 3/2019 | Zeng | H04B 17/309 |
| 2019/0097690 A1 | 3/2019 | Kim et al. | |
| 2019/0342873 A1* | 11/2019 | Kim | H04W 56/0005 |
| 2020/0119773 A1 | 4/2020 | Kim et al. | |
| 2020/0177230 A1* | 6/2020 | Zeng | H04W 52/365 |
| 2020/0260262 A1* | 8/2020 | Hong | H04W 8/22 |
| 2020/0260461 A1* | 8/2020 | Hong | H04W 8/24 |
| 2020/0280870 A1* | 9/2020 | Hong | H04W 24/10 |
| 2020/0344832 A1* | 10/2020 | Hu | H04W 72/0453 |
| 2021/0099859 A1* | 4/2021 | Jiang | H04L 5/14 |
| 2021/0195574 A1* | 6/2021 | Hong | H04W 72/048 |

FOREIGN PATENT DOCUMENTS

| | | | |
|---|---|---|---|
| CN | 104519583 A | 4/2015 | |
| CN | 105517043 A | 4/2016 | |
| CN | 105813202 A | 7/2016 | |
| CN | 107294675 A | 10/2017 | |
| CN | 108401531 A | 8/2018 | |
| EP | 2905989 B1 * | 12/2020 | .......... H04L 5/0007 |
| JP | 2017-509234 A | 3/2017 | |
| WO | WO 2014/112848 A1 | 7/2014 | |
| WO | WO 2015/044771 A2 | 4/2015 | |
| WO | WO 2015/142248 A1 | 9/2015 | |
| WO | WO 2015/160198 A1 | 10/2015 | |
| WO | WO2021028304 A1 * | 2/2021 | |

OTHER PUBLICATIONS

S. A. Hovanessian, L. B. Jocic, J. K. Kreng, G. L. Lui and S. H. Raghavan, "Multi-user transparent-dehop MILSATCOM system," Proceedings of MILCOM '95, 1995, pp. 340-346 vol. 1, doi: 10.1109/MILCOM.1995.483384.Aug. 2002 (Year: 2002).*

First Office Action of Chinese Application No. 201780001842.0, dated Apr. 2, 2021.

Samsung: "UE capability coordination in case of IRAT DC", 3GPP TSG-RAN WG2 Meeting #95, R2-165044, Gothenburg, Sweden, Aug. 22-26, 2016, 6 pages.

Ericsson: "UE capability coordination for LTE-NR interworking", 3GPP TSG-RAN WG2 NR#2, Tdoc R2-1706577, Qingdao, China, Jun. 27-29, 2017, 9 pages.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.9.0 (Mar. 2016), Mar. 30, 2016, 455 pages.

Extended European Search Report in European application No. 17931955.3, dated Jun. 7, 2021.

Huawei et al., UE Capability Coordination in LTE-NR Tight Interworking, R2-1701851, 3GPP TSG-RAN WG2 Meeting #97, Athens, Greece, Feb. 13-17, 2017, 2 pages.

International Search Report in International Application No. PCT/CN2017/110911, dated Jul. 30, 2018.

English translation of the Written Opinion of the International Search Authority in the International Application No. PCT/CN2017/110911, dated Jul. 30, 2018.

Examination Report dated Aug. 10, 2021, from the Indian Patent Office in counterpart Indian Application No. 202047024607.

* cited by examiner

COMMUNICATION LINK CONFIGURATION METHOD AND DEVICE

CROSS REFERENCE TO RELATED APPLICATIONS

This application is a national phase application based on PCT/CN2017/110911, filed Nov. 14, 2017, the content of which is incorporated herein by reference.

TECHNICAL FIELD

The disclosure relates to the technical field of communication, and more particularly to a method and device for configuring a communication link.

BACKGROUND

With the continuous development of a communication technology, smart terminals have been widely applied. In a new generation communication system, a new application scenario is provided, that is, an EUTRAN NR-Dual Connectivity (EN-DC) (dual connection of the Long Term Evolution (LTE) network and the New Radio (NR) network) scenario. The LTE network is the 4G network. The NR network is the 5G network. In this scenario, two communication links including the LTE communication link and the NR communication link are simultaneously maintained in a terminal. However, in the related art, if a terminal performs uplink transmission on two frequency bands simultaneously, serious intermodulation distortion may be caused to downlink receiving in a certain frequency band, which degrades the performance of the terminal.

SUMMARY

In order to overcome the problems in the related art, the embodiments of the disclosure provide a method and device for configuring a communication link.

According to a first aspect of the embodiments of the disclosure, a method for configuring a communication link is provided. The method is applied to a base station. The method includes operations as follows.

Capability enquiry signaling is sent to a terminal. The capability enquiry signaling is configured to enquire about a wireless transmission capability of the terminal.

Capability reporting signaling sent by the terminal is received. The capability reporting signaling includes first information for representing the wireless transmission capability of the terminal.

A communication link is configured for the terminal according to the first information.

Optionally, the first information includes all band combinations and/or all channel combinations, each of which is supportable by the terminal and does not cause inter modulation distortion.

Optionally, the operation that capability enquiry signaling is sent to a terminal includes operations as follows.

Second information is generated. The second information is configured to represent one or more designated wireless transmission capabilities of the terminal enquired by the base station.

The second information is added into the capability enquiry signaling.

The capability enquiry signaling carrying the second information is sent to the terminal.

Optionally, the designated wireless transmission capabilities may include at least one designated band combination and/or at least one designated channel combination.

Optionally, the first information may include at least one band combination and/or at least one channel combination corresponding to the designated wireless transmission capabilities, respectively. The at least one band combination and/or the at least one channel combination is each supportable by the terminal and does not cause intermodulation distortion.

Optionally, the operation that a communication link is configured for the terminal according to the first information includes operations as follows.

In response to determining according to the first information that the terminal does not support a first band combination, and a channel combination corresponding to the first band combination does not include a channel combination supportable by the terminal, it is determined that the first band combination is not a communication link used by the terminal for simultaneous sending data.

In response to determining according to the first information that the terminal does not support a second band combination, and a channel combination corresponding to the second band combination includes a channel combination supportable by the terminal, the supportable channel combination is determined as a communication link used by the terminal for simultaneous sending data.

In response to determining according to the first information that the terminal supports a third band combination, the third band combination is determined as a communication link used by the terminal for simultaneous sending data.

According to a second aspect of the embodiments of the disclosure, a method for configuring a communication link is provided. The method is applied to a terminal. The method includes operations as follows.

Capability enquiry signaling sent by a base station is received. The capability enquiry signaling is configured to enquire about a wireless transmission capability of the terminal.

First information is generated according to the capability enquiry signaling. The first information is configured to represent the wireless transmission capability of the terminal.

Capability reporting signaling carrying the first information is sent to the base station. The base station configures a communication link for the terminal according to the first information.

Optionally, the first information may include all band combinations and/or all channel combinations, each of which is supportable by the terminal and does not cause intermodulation distortion.

Optionally, the capability enquiry signaling may include second information. The second information is configured to represent one or more designated wireless transmission capabilities of the terminal enquired by the base station.

The operation that the first information is generated according to the capability enquiry signaling may include operations as follows.

The first information is generated according to the second information. The first information includes at least one band combination and/or at least one channel combination corresponding to the designated wireless transmission capabilities, respectively. The at least one band combination and/or the at least one channel combination is each supportable by the terminal and does not cause intermodulation distortion.

Optionally, the designated wireless transmission capabilities may include at least one designated band combination and/or at least one designated channel combination.

According to a third aspect of the embodiments of the disclosure, a device for configuring a communication link is provided. The device is applied to a base station. The device includes a first sending module, a first receiving module and a configuration module.

The first sending module is configured to send capability enquiry signaling to a terminal. The capability enquiry signaling is configured to enquire about a wireless transmission capability of the terminal.

The first receiving module is configured to receive capability reporting signaling sent by the terminal. The capability reporting signaling includes first information for representing the wireless transmission capability of the terminal.

The configuration module is configured to configure a communication link for the terminal according to the first information.

Optionally, the first information may include all band combinations and/or all channel combinations each of which is supportable by the terminal and does not cause intermodulation distortion.

Optionally, the first sending module may include a first generation sub-module, an adding sub-module and a sending sub-module.

The first generation sub-module is configured to generate second information. The second information is configured to represent one or more designated wireless transmission capabilities of the terminal enquired by the base station.

The addition sub-module is configured to add the second information into the capability enquiry signaling.

The sending sub-module is configured to send the capability enquiry signaling carrying the second information to the terminal.

Optionally, the designated wireless transmission capabilities may include at least one designated band combination and/or at least one designated channel combination.

Optionally, the first information may include at least one band combination and/or at least one channel combination corresponding to the designated wireless transmission capabilities, respectively. The at least one band combination and/or the at least one channel combination is each supportable by the terminal and does not cause intermodulation distortion.

Optionally, the configuration module may include a first configuration sub-module, a second configuration sub-module and a third configuration sub-module.

The first configuration sub-module is configured to, in response to determining according to the first information that the terminal does not support a first band combination and a channel combination corresponding to the first band combination does not include a channel combination supportable by the terminal, determine that the first band combination is not a communication link used by the terminal for simultaneous data transmission.

The second configuration sub-module is configured to, in response to determining according to the first information that the terminal does not support a second band combination while a channel combination corresponding to the second band combination includes a channel combination supportable by the terminal, determine the supportable channel combination as a communication link used by the terminal for simultaneous data transmission.

The third configuration sub-module is configured to, in response to determining according to the first information that the terminal supports a third band combination, determine the third band combination as a communication link used by the terminal for simultaneous data transmission.

According to a fourth aspect of the embodiments of the disclosure, a device for configuring a communication link is provided. The device is applied to a terminal. The device includes a second receiving module, an information generation module and a second sending module.

The second receiving module is configured to receive capability enquiry signaling sent by a base station. The capability enquiry signaling is configured to enquire about a wireless transmission capability of the terminal.

The information generation module is configured to generate first information according to the capability enquiry signaling. The first information is configured to represent the wireless transmission capability of the terminal.

The second sending module is configured to send capability reporting signaling carrying the first information to the base station, so that the base station configures a communication link for the terminal according to the first information.

Optionally, the first information may include all band combinations and/or all channel combinations, each of which is supportable by the terminal and does not cause intermodulation distortion.

Optionally, the capability enquiry signaling may include second information. The second information is configured to represent one or more designated wireless transmission capabilities of the terminal enquired by the base station. The information generation module may include a second generating sub-module.

The second generation sub-module is configured to generate the first information according to the second information. The first information includes at least one band combination and/or at least one channel combination corresponding to the designated wireless transmission capabilities, respectively. The at least one band combination and/or the at least one channel combination is each supportable by the terminal and does not cause intermodulation distortion.

Optionally, the designated wireless transmission capabilities may include at least one designated band combination and/or at least one designated channel combination.

According to a fifth aspect of the embodiment of the disclosure, a non-transitory computer-readable storage medium is provided. A computer program may be stored on the storage medium. The computer program may be configured to perform the method for configuring a communication link in the first aspect.

According to a sixth aspect of the embodiment of the disclosure, a non-transitory computer-readable storage medium is provided. A computer program may be stored on the storage medium. The computer program may be configured to perform the method for configuring a communication link in the second aspect.

According to a seventh aspect of the embodiments of the disclosure, a device for configuring a communication link is provided. The device may be applied to a base station. The device may include:

a processor; and a memory configured to store a processor-executable instruction.

The processor may be configured to:

send capability enquiry signaling to a terminal, the capability enquiry signaling being configured to enquire about a wireless transmission capability of the terminal;

receive capability reporting signaling sent by the terminal, the capability reporting signaling including first information for representing the wireless transmission capability of the terminal; and configure a communication link for the terminal according to the first information.

According to an eighth aspect of the embodiments of the disclosure, a device for configuring a communication link is provided. The device is applied to a terminal. The device includes:

a processor; and a memory configured to store a processor-executable instruction.

The processor may be configured to:

receive capability enquiry signaling sent by a base station, the capability enquiry signaling being configured to enquire about a wireless transmission capability of the terminal;

generate first information according to the capability enquiry signaling, the first information being configured to represent the wireless transmission capability of the terminal; and send capability reporting signaling carrying the first information to the base station, so that the base station configures a communication link for the terminal according to the first information.

The technical solutions provided by the embodiments of the disclosure include the following beneficial effects.

In the disclosure, the base station may send capability enquiry signaling to the terminal. The capability enquiry signaling is configured to enquire about a wireless transmission capability of the terminal. The base station receives capability reporting signaling sent by the terminal. The capability reporting signaling includes first information for representing the wireless transmission capability of the terminal. A communication link is configured for the terminal according to the first information. Therefore, the communication link is configured for the terminal according to the wireless transmission capability of the terminal, thereby improving the accuracy of communication link configuration, and further improving the communication quality.

In the disclosure, the terminal may receive capability enquiry signaling sent by the base station. The capability enquiry signaling is configured to enquire about a wireless transmission capability of the terminal. The terminal generates first information according to the capability enquiry signaling. The first information is configured to represent the wireless transmission capability of the terminal. Capability reporting signaling carrying the first information is sent to the base station. Therefore, the base station configures a communication link for the terminal according to the wireless transmission capability of the terminal, thereby improving the accuracy of communication link configuration, and further improving the communication quality.

It is to be understood that the above general description and the following detailed description are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and along with the specification, serve to explain the principles of the disclosure.

DETAILED DESCRIPTION

Exemplary embodiments are illustrated here in detail, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure, instead are merely examples of the devices and methods consistent with some aspects of the disclosure as recited in the appended claims.

Figure 1:
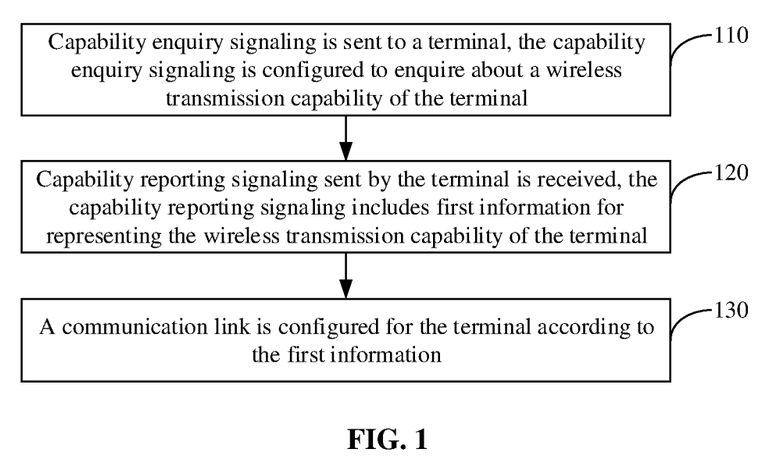
FIG. 1 is a flowchart illustrating a method for configuring a communication link according to an exemplary embodiment.
Figure 2:
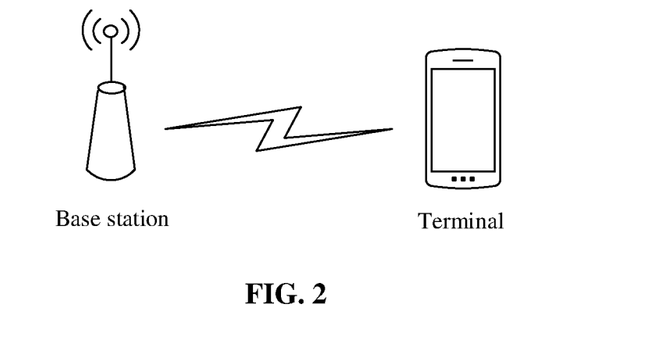
FIG. 2 is a diagram illustrating a scenario of a method for configuring a communication link according to an exemplary embodiment.

FIG. 1 is a flowchart illustrating a method for configuring a communication link according to an exemplary embodiment. FIG. 2 is a diagram illustrating a scenario of a method for configuring a communication link according to an exemplary embodiment. The method for configuring a communication link may be applied to a base station. As illustrated in FIG. 1, the method for configuring a communication link includes operations 110 to 130.

In operation 110, capability enquiry signaling is sent to a terminal. The capability enquiry signaling is configured to enquire about a wireless transmission capability of the terminal.

In the embodiment of the disclosure, before configuring a communication link for the terminal, the base station may enquire the terminal about wireless transmission capability of the terminal. In this way, the base station learns the wireless transmission capability of the terminal, and then configures a communication link for the terminal within the range of wireless transmission capability, thereby preventing from configuring a communication link beyond the range of wireless transmission capability for the terminal.

In operation 120, capability reporting signaling sent by the terminal is received. The capability reporting signaling includes first information for representing the wireless transmission capability of the terminal.

In operation 130, a communication link is configured for the terminal according to the first information.

An exemplary scenario is as illustrated in FIG. 2, in which a terminal and a base station are included. When the base station configures a communication link for the terminal, in order to learn a wireless transmission capability of the terminal, the base station may enquire about the wireless transmission capability of the terminal through capability enquiry signaling. After receiving the capability enquiry signaling of the base station, the terminal may generate first information for representing the wireless transmission capability thereof and send the first information to the base station through capability reporting signaling. After learning the wireless transmission capability of the terminal from the first information, the base station may configure a communication link for the terminal within a range of the wireless transmission capability.

It can be seen from the above embodiments that capability enquiry signaling is sent to the terminal. The capability enquiry signaling is configured to enquire about a wireless transmission capability of the terminal. Capability reporting signaling sent by the terminal is received. The capability reporting signaling includes first information for representing the wireless transmission capability of the terminal. A communication link is configured for the terminal according to the first information. Therefore, the communication link is configured for the terminal according to the wireless transmission capability of the terminal, thereby improving the accuracy of communication link configuration, and further improving the communication quality.

In one embodiment, based on the method illustrated in FIG. 1, the first information in operation 120 may include all band combinations and/or all channel combinations, each of which is supportable by the terminal and does not cause intermodulation distortion.

In this way, the base station sends capability enquiry signaling to the terminal, the capability enquiry signaling does not explicitly indicate which wireless transmission capability of the terminal is enquired about, but indicates enquiring about the wireless transmission capability of the terminal. After receiving the capability enquiry signaling, the terminal may report, to the base station, all band combinations and/or all channel combinations, each of which is supportable by the terminal and does not cause intermodulation distortion.

For example, a band combination is BAND1 and BAND2. That is, the terminal supports simultaneous sending on BAND1 and BAND2.

It can be seen from the above embodiments that the first information for representing the wireless transmission capability of the terminal may include all band combinations and/or all channel combinations, each of which is supportable by the terminal and does not cause intermodulation distortion. In this way, the base station learns all wireless transmission capabilities of the terminal according to the first information, and it is convenient for the base station to configure a reasonable communication link for the terminal, thereby avoiding configuring a communication link that may generate intermodulation distortion for the terminal, and improving the reliability of communication link configuration.

Figure 3:
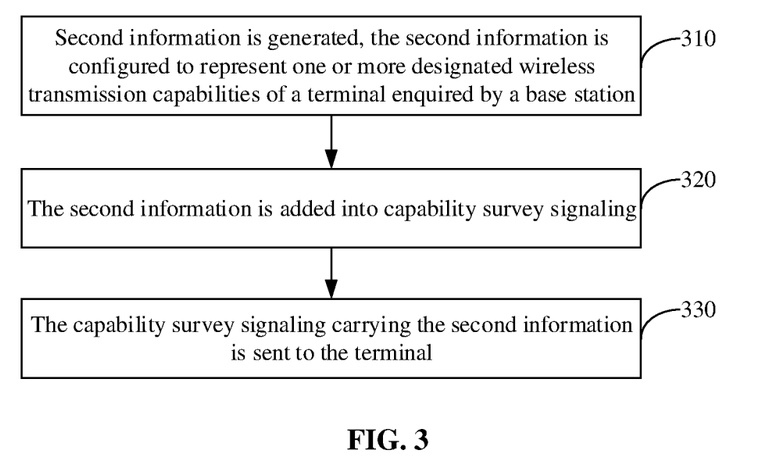
FIG. 3 is a flowchart illustrating another method for configuring a communication link according to an exemplary embodiment.

FIG. 3 is a flowchart illustrating another method for configuring a communication link according to an exemplary embodiment. The method for configuring the communication link may be applied to a base station. Based on the method illustrated in FIG. 1, the base station enquires about one or more designated wireless transmission capabilities of the terminal through capability enquiry signaling. When operation 110 is performed, as illustrated in FIG. 3, operations 310 to 330 may be included.

In operation 310, second information is generated. The second information is configured to represent one or more designated wireless transmission capabilities of the terminal enquired by the base station.

In operation 320, the second information is added into capability enquiry signaling.

In operation 330, the capability enquiry signaling carrying the second information is sent to the terminal.

It can be seen from the above embodiments that second information is generated, which is configured to represent one or more designated wireless transmission capabilities of the terminal enquired by the base station. The second information is added into the capability enquiry signaling. The capability enquiry signaling carrying the second information is sent to the terminal. Therefore, it is convenient for the terminal to report a designated wireless transmission capability which is supportable by the terminal to the base station in a targeted manner, thereby enriching the way in which the base station enquires about the wireless transmission capability of the terminal, and also improving the efficiency of communication link configuration.

In one embodiment, based on the method shown in FIG. 3, the designated wireless transmission capabilities in operation 310 may include at least one designated band combination and/or at least one designated channel combination.

For example, the designated band combination is BAND3 and BAND4. The base station may add BAND3 and BAND4 into the capability enquiry signaling, to acquire whether the terminal supports simultaneous sending on BAND3 and BAND4 without causing intermodulation distortion.

It can be seen from the above embodiments that the capability enquiry signaling may be configured to enquire whether the terminal supports a designated band combination and/or a designated channel combination. Therefore, it is convenient for the terminal to report the designated band combination and/or the designated channel combination that is supportable by the terminal to the base station in a targeted manner, thereby improving a speed at which the base station configures a communication link for the terminal, and improving the practicality of communication link configuration.

In one embodiment, based on the method illustrated in FIG. 3, the first information in operation 120 may include at least one band combination and/or at least one channel combination corresponding to the designated wireless transmission capabilities, respectively. The at least one band combination and/or the at least one channel combination is each supportable by the terminal and does not cause intermodulation distortion.

In this way, the base station enquires about one or more designated wireless transmission capabilities of the terminal through the capability enquiry signaling, and the terminal may report to the base station at least one band combination and/or at least one channel combination corresponding to the designated wireless transmission capabilities, respectively. The at least one band combination and/or the at least one channel combination is each supportable by the terminal and does not cause intermodulation distortion.

It can be seen from the above embodiments that the first information for representing the wireless transmission capability of the terminal may include at least one band combination and/or at least one channel combination corresponding to the designated wireless transmission capabilities, respectively, the at least one band combination and/or the at least one channel combination being each supportable by the terminal and causing no intermodulation distortion, thereby meeting the personalized requirement of enquiring about the designated wireless transmission capabilities of the terminal by the base station through the capability enquiry signaling, preventing the base station from configuring a communication link that may generate intermodulation distortion for the terminal, and improving the reliability of communication link configuration.

Figure 4:
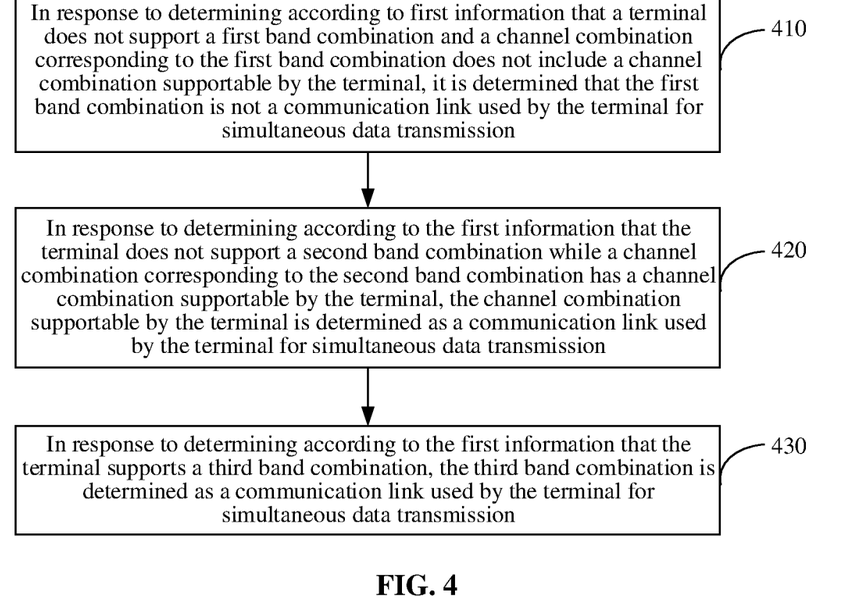
FIG. 4 is a flowchart illustrating another method for configuring a communication link according to an exemplary embodiment.

FIG. 4 is a flowchart illustrating another method for configuring a communication link according to an exemplary embodiment. The method for configuring the communication link may be applied to a base station. Based on the method illustrated in FIG. 1 or FIG. 3, when operation 130 is performed, as illustrated in FIG. 4, operations 410 to 430 may be included.

In operation 410, in response to determining according to the first information that the terminal does not support a first band combination and a channel combination corresponding to the first band combination does not have a channel combination supportable by the terminal, it is determined that the first band combination is not a communication link used by the terminal for simultaneous data transmission.

In operation 420, in response to determining according to the first information that the terminal does not support a second band combination while a channel combination corresponding to the second band combination has a channel combination supportable by the terminal, the channel combination supportable by the terminal is determined as a communication link used by the terminal for simultaneous data transmission.

In operation 430, in response to determining according to the first information that the terminal supports a third band combination, the third band combination is determined as a communication link used by the terminal for simultaneous data transmission.

It can be seen from the above embodiments that the band combination or the channel combination supported by the terminal is determined as a communication link used by the terminal for simultaneous data transmission. In this way, the communication link configured by the base station for the terminal is within the range of wireless transmission capability of the terminal, and does not cause intermodulation distortion, thereby improving the accuracy of communication link configuration and also improving the communication quality.

Figure 5:
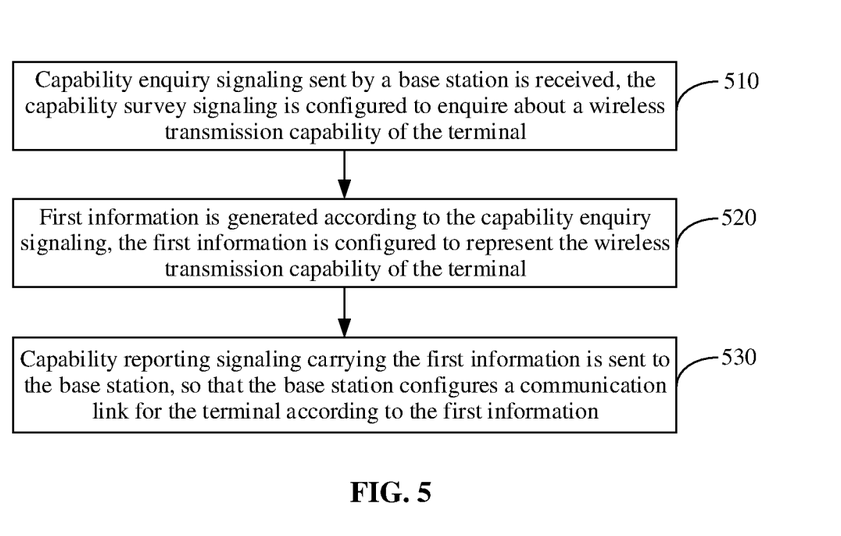
FIG. 5 is a flowchart illustrating a method for configuring a communication link according to an exemplary embodiment.

FIG. 5 is a flowchart illustrating a method for configuring a communication link according to an exemplary embodiment. The method for configuring the communication link may be applied to a terminal. As shown in FIG. 5, the method for configuring the communication link includes operations 510 to 530.

In operation 510, capability enquiry signaling sent by a base station is received. The capability enquiry signaling is configured to enquire about a wireless transmission capability of the terminal.

In operation 520, first information is generated according to the capability enquiry signaling. The first information is configured to represent the wireless transmission capability of the terminal.

In operation 530, capability reporting signaling carrying the first information is sent to the base station, so that the base station configures a communication link for the terminal according to the first information.

It can be seen from the above embodiments that capability enquiry signaling sent by the base station is received. The capability enquiry signaling is configured to enquire about a wireless transmission capability of the terminal. First information is generated according to the capability enquiry signaling. The first information is configured to represent the wireless transmission capability of the terminal. Capability reporting signaling carrying the first information is sent to the base station. Therefore, the base station configures a communication link for the terminal according to the wireless transmission capability of the terminal, thereby improving the accuracy of communication link configuration, and further improving the communication quality.

In one embodiment, based on the method shown in FIG. 5, the first information in operation 520 may include all band combinations and/or all channel combinations, each of which is supportable by the terminal and does not cause intermodulation distortion.

In this way, the base station sends capability enquiry signaling to the terminal, the capability enquiry signaling does not explicitly indicate which wireless transmission capability of the terminal is enquired about, but only indicates enquiring about the wireless transmission capability of the terminal. After receiving the capability enquiry signaling, the terminal may report to the base station all band combinations and/or all channel combinations, each of which is supportable by the terminal and does not cause intermodulation distortion.

It can be seen from the above embodiments that the first information for representing the wireless transmission capability of the terminal may include all band combinations and/or all channel combinations, each of which is supportable by the terminal and does not cause intermodulation distortion. In this way, the base station learns all wireless transmission capabilities of the terminal according to the first information, and it is convenient for the base station to configure a reasonable communication link for the terminal, thereby avoiding configuring a communication link that may cause intermodulation distortion for the terminal, and improving the reliability of communication link configuration.

Figure 6:
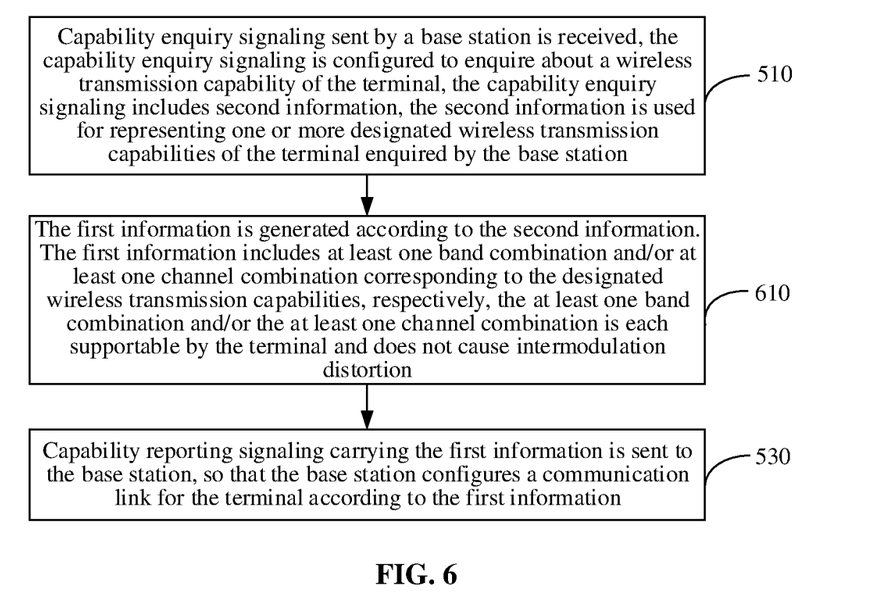
FIG. 6 is a flowchart illustrating another method for configuring a communication link according to an exemplary embodiment.

FIG. 6 is a flowchart illustrating another method for configuring a communication link according to an exemplary embodiment. The method for configuring a communication link may be applied to a terminal. Based on the method illustrated in FIG. 5, the capability enquiry signaling includes second information for representing one or more designated wireless transmission capabilities of the terminal enquired by the base station. When operation 520 is performed, as illustrated in FIG. 6, operation 610 may be included.

In operation 610, the first information is generated according to the second information. The first information includes at least one band combination and/or at least one channel combination corresponding to the designated wireless transmission capabilities, respectively. The at least one band combination and/or the at least one channel combination is each supportable by the terminal and does not cause intermodulation distortion.

In this way, the base station enquires about one or more designated wireless transmission capabilities of the terminal through the capability enquiry signaling, and the terminal may report to the base station at least one band combination and/or at least one channel combination corresponding to the designated wireless transmission capabilities, respectively. The at least one band combination and/or the at least one channel combination is each supportable by the terminal and does not cause intermodulation distortion.

It can be seen from the above embodiments that the first information for representing the wireless transmission capability of the terminal may include at least one band combination and/or at least one channel combination corresponding to the designated wireless transmission capabilities, respectively, the at least one band combination and/or the at least one channel combination being each supportable by the terminal and causing no intermodulation distortion, thereby meeting the personalized requirements of enquiring about the designated wireless transmission capabilities of the terminal by the base station through the capability enquiry signaling, preventing the base station from configuring a communication link that may cause intermodulation distortion for the terminal, and improving the reliability of communication link configuration.

In one embodiment, based on the method illustrated in FIG. 6, the designated wireless transmission capabilities may include at least one designated band combination and/or at least one designated channel combination.

It can be seen from the above embodiments that the capability enquiry signaling may be configured to enquire whether the terminal supports a designated band combination and/or a designated channel combination. Therefore, it is convenient for the terminal to report the designated band combination and/or the designated channel combination supportable by the terminal to the base station in a targeted manner, thereby improving the speed at which the base station configures a communication link for the terminal, and improving the practicality of communication link configuration.

Corresponding to the embodiment of the above method for configuring a communication link, the disclosure further provides an embodiment of a device for configuring a communication link.

Figure 7:
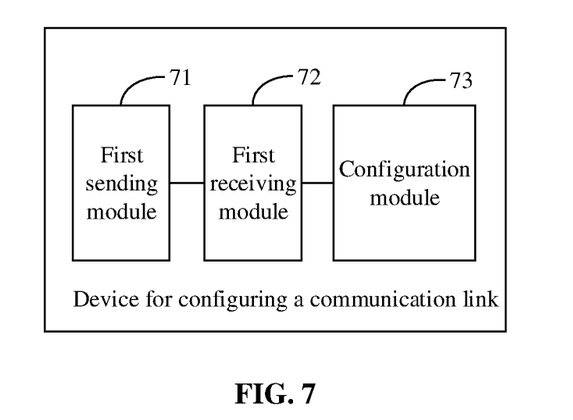
FIG. 7 is a block diagram illustrating a device for configuring a communication link according to an exemplary embodiment.

FIG. 7 is a block diagram illustrating a device for configuring a communication link according to an exemplary embodiment. The device is applied to a base station, and is configured to perform the method for configuring a communication link illustrated in FIG. 1. As illustrated in FIG. 7, the device for configuring a communication link may include a first sending module 71, a first receiving module 72 and a configuration module 73.

The first sending module 71 is configured to send capability enquiry signaling to a terminal. The capability enquiry signaling is configured to enquire about a wireless transmission capability of the terminal.

The first receiving module 72 is configured to receive capability reporting signaling sent by the terminal. The capability reporting signaling includes first information for representing the wireless transmission capability of the terminal.

The configuration module 73 is configured to configure a communication link for the terminal according to the first information.

It can be seen from the above embodiments that capability enquiry signaling is sent to the terminal. The capability enquiry signaling is configured to enquire about a wireless transmission capability of the terminal. Capability reporting signaling sent by the terminal is received. The capability reporting signaling includes first information for representing the wireless transmission capability of the terminal. A communication link is configured for the terminal according to the first information. Therefore, the communication link is configured for the terminal according to the wireless transmission capability of the terminal, thereby improving the accuracy of communication link configuration, and further improving the communication quality.

In one embodiment, based on the device illustrated in FIG. 7, the first information includes all band combinations and/or all channel combinations, each of which is supportable by the terminal and does not cause intermodulation distortion.

It can be seen from the above embodiments that the first information for representing the wireless transmission capability of the terminal may include all band combinations and/or all channel combinations which is supportable by the terminal and does not cause intermodulation distortion. In this way, the base station learns all wireless transmission capabilities of the terminal according to the first information, and it is convenient for the base station to configure a reasonable communication link for the terminal, thereby avoiding configuring a communication link that may cause intermodulation distortion for the terminal, and improving the reliability of communication link configuration.

Figure 8:
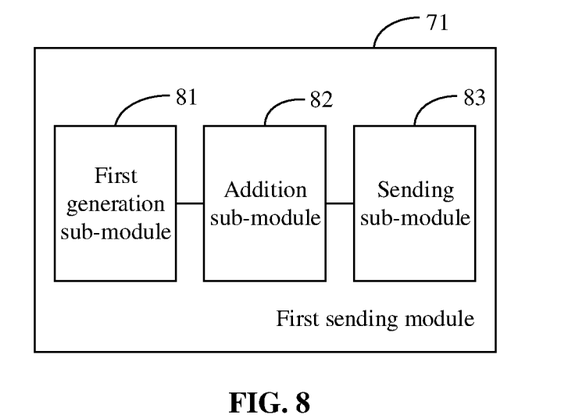
FIG. 8 is a block diagram illustrating another device for configuring a communication link according to an exemplary embodiment.

In one embodiment, based on the device illustrated in FIG. 7, as shown in FIG. 8, the first sending module 71 may include a first generation sub-module 81, an addition sub-module 82 and a sending sub-module 83.

The first generation sub-module 81 is configured to generate second information. The second information is configured to represent one or more designated wireless transmission capabilities of the terminal enquired by the base station.

The addition sub-module 82 is configured to add the second information into the capability enquiry signaling.

The sending sub-module 83 is configured to send the capability enquiry signaling carrying the second information to the terminal.

It can be seen from the above embodiments that second information is generated, which is configured to represent one or more designated wireless transmission capabilities of the terminal enquired by the base station. The second information is added into the capability enquiry signaling. The capability enquiry signaling carrying the second information is sent to the terminal. Therefore, it is convenient for the terminal to report a designated wireless transmission capability which is supportable by the terminal to the base station in a targeted manner, thereby enriching the way in which the base station enquiries about the wireless transmission capability of the terminal, and also improving the efficiency of communication link configuration.

In one embodiment, based on the device illustrated in FIG. 8, the designated wireless transmission capabilities include at least one designated band combination and/or at least one designated channel combination.

It can be seen from the above embodiments that the capability enquiry signaling may be configured to enquire whether the terminal supports a designated band combination and/or a designated channel combination. Therefore, it is convenient for the terminal to report the designated band combination and/or the designated channel combination that is supportable by the terminal to the base station in a targeted manner, thereby improving a speed at which the base station configures a communication link for the terminal, and improving the practicality of communication link configuration.

In one embodiment, based on the device illustrated in FIG. 8, the first information includes at least one band combination and/or at least one channel combination corresponding to the designated wireless transmission capabilities, respectively. The at least one band combination and/or the at least one channel combination is each supportable by the terminal and does not cause intermodulation distortion.

It can be seen from the above embodiments that the first information for representing the wireless transmission capability of the terminal may include at least one band combination and/or at least one channel combination corresponding to the designated wireless transmission capabilities, respectively, the at least one band combination and/or the at least one channel combination being each supportable by the terminal and causing no intermodulation distortion, thereby meeting the personalized requirements of enquiring about the designated wireless transmission capabilities of the terminal by the base station through the capability enquiry signaling, preventing the base station from configuring a communication link that may cause intermodulation distortion for the terminal, and improving the reliability of communication link configuration.

Figure 9:
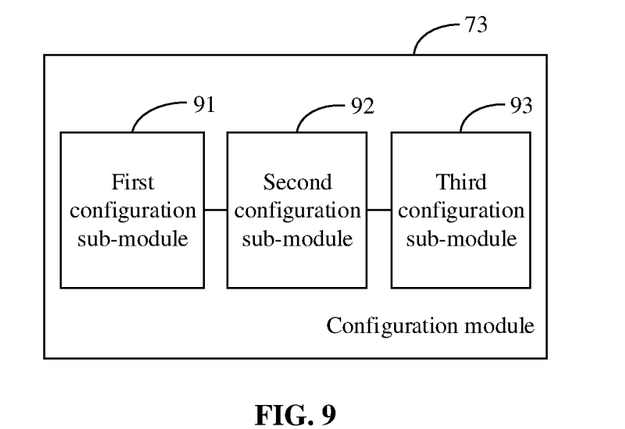
FIG. 9 is a block diagram illustrating another device for configuring a communication link according to an exemplary embodiment.

In one embodiment, based on the device illustrated in FIG. 7 or FIG. 8, as illustrated in FIG. 9, the configuration module 73 may include a first configuration sub-module 91, a second configuration sub-module 92 and a third configuration sub-module 93.

The first configuration sub-module 91 is configured to, in response to determining according to the first information that the terminal does not support a first band combination and a channel combination corresponding to the first band combination does not includes a channel combination supportable by the terminal, determine that the first band combination is not a communication link used by the terminal for simultaneous data transmission.

The second configuration sub-module 92 is configured to, in response to determining according to the first information that the terminal does not support a second band combination while a channel combination corresponding to the second band combination includes a channel combination supportable by the terminal, determine the supportable channel combination as a communication link used by the terminal for simultaneous data transmission.

The third configuration sub-module 93 is configured to, in response to determining according to the first information that the terminal supports a third band combination, determine the third band combination as a communication link used by the terminal for simultaneous data transmission.

It can be seen from the above embodiments that the band combination or the channel combination supported by the terminal is determined as a communication link used by the terminal for simultaneous data transmission. In this way, the communication link configured by the base station for the terminal is within the range of wireless transmission capability of the terminal, and does not cause intermodulation distortion, thereby improving the accuracy of communication link configuration and also improving the communication quality.

Figure 10:
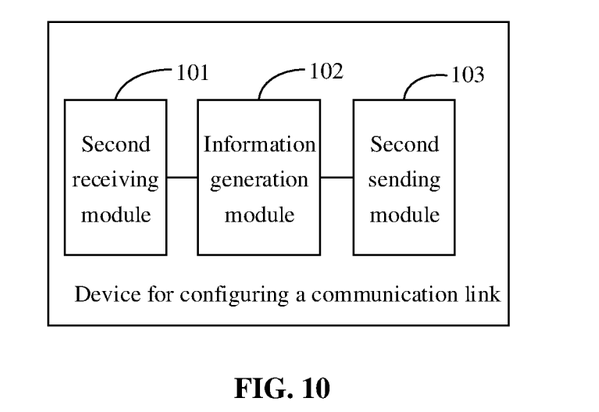
FIG. 10 is a block diagram illustrating a device for configuring a communication link according to an exemplary embodiment.

FIG. 10 is a block diagram illustrating a device for configuring a communication link according to an exemplary embodiment. The device is applied to a terminal, and is configured to perform the method for configuring a communication link shown in FIG. 5. As illustrated in FIG. 10, the device for configuring a communication link may include a second receiving module 101, an information generation module 102 and a second sending module 103.

The second receiving module 101 is configured to receive capability enquiry signaling sent by a base station. The capability enquiry signaling is configured to enquire about a wireless transmission capability of the terminal.

The information generation module 102 is configured to generate first information according to the capability enquiry signaling. The first information is configured to represent the wireless transmission capability of the terminal.

The second sending module 103 is configured to send capability reporting signaling carrying the first information to the base station, such that the base station configures a communication link for the terminal according to the first information.

It can be seen from the above embodiments that capability enquiry signaling sent by the base station is received. The capability enquiry signaling is configured to enquire about a wireless transmission capability of the terminal. First information is generated according to the capability enquiry signaling. The first information is configured to represent the wireless transmission capability of the terminal. Capability reporting signaling carrying the first information is sent to the base station. Therefore, the base station configures a communication link for the terminal according to the wireless transmission capability of the terminal, thereby improving the accuracy of communication link configuration, and further improving the communication quality.

In one embodiment, based on the device illustrated in FIG. 10, the first information includes all band combinations and/or all channel combinations, each of which is supportable by the terminal and does not cause intermodulation distortion.

It can be seen from the above embodiments that the first information for representing the wireless transmission capability of the terminal may include all band combinations and/or all channel combinations, each of which is supportable by the terminal and does not cause intermodulation distortion. In this way, the base station learns all wireless transmission capabilities of the terminal according to the first information, and it is convenient for the base station to configure a reasonable communication link for the terminal, thereby avoiding configuring a communication link which may cause intermodulation distortion for the terminal, and improving the reliability of communication link configuration.

Figure 11:
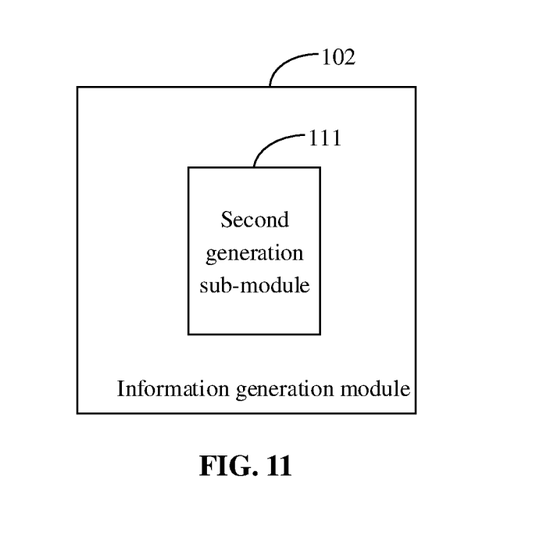
FIG. 11 is a block diagram illustrating another device for configuring a communication link according to an exemplary embodiment.

In one embodiment, based on the device illustrated in FIG. 10, the capability enquiry signaling includes second information. The second information is configured to represent one or more designated wireless transmission capabilities of the terminal enquired by the base station. As illustrated in FIG. 11, the information generation module 102 may include a second generation sub-module 111.

The second generation sub-module 111 is configured to generate the first information according to the second information. The first information includes at least one band combination and/or at least one channel combination corresponding to the designated wireless transmission capabilities, respectively. The at least one band combination and/or the at least one channel combination is each supportable by the terminal and does not cause intermodulation distortion.

It can be seen from the above embodiments that the first information for representing the wireless transmission capability of the terminal may include at least one band combination and/or at least one channel combination corresponding to the designated wireless transmission capabilities, respectively, the at least one band combination and/or the at least one channel combination being each supportable by the terminal and causing no intermodulation distortion, thereby meeting the personalized requirements of enquiring about the designated wireless transmission capabilities of the terminal by the base station through the capability enquiry signaling, preventing the base station from configuring a communication link that may cause intermodulation distortion for the terminal, and improving the reliability of communication link configuration.

In one embodiment, based on the device illustrated in FIG. 11, the designated wireless transmission capabilities include at least one designated band combination and/or at least one designated channel combination.

It can be seen from the above embodiments that the capability enquiry signaling may be configured to enquire whether the terminal supports a designated band combination and/or a designated channel combination. Therefore, it is convenient for the terminal to report the designated band combination and/or the designated channel combination supportable by the terminal to the base station in a targeted manner, thereby improving the speed at which the base station configures a communication link for the terminal, and improving the practicality of communication link configuration.

The device embodiments substantially correspond to the method embodiments. Therefore, regarding related parts for the device embodiments, reference may be made to descriptions in the method embodiments. The device embodiment described above is only schematic. Units described as separate components described above may or may not be physically separated. Components displayed as units may or may not be physical units. That is, the components may be located in the same place or may also be distributed to multiple network units. A part or all of the modules therein may be selected according to a practical requirement to achieve the purpose of the solutions of the disclosure. Those skilled in the art may understand and implement without creative work.

The disclosure further provides a non-transitory computer-readable storage medium having stored thereon a computer program. The computer program is configured to perform the method for configuring a communication link described in any one of FIG. 1 to FIG. 4.

The disclosure further provides a non-transitory computer-readable storage medium having stored thereon a computer program. The computer program is configured to perform the method for configuring a communication link described in any one of FIG. 5 to FIG. 6.

The disclosure further provides a device for configuring a communication link. The device is applied to a base station. The device includes:
a processor; and
a memory configured to store a processor-executable instruction.

The processor is configured to:
send capability enquiry signaling to a terminal, the capability enquiry signaling being configured to enquire about a wireless transmission capability of the terminal;
receive capability reporting signaling sent by the terminal, the capability reporting signaling including first information for representing the wireless transmission capability of the terminal; and
configure a communication link for the terminal according to the first information.

Figure 12:
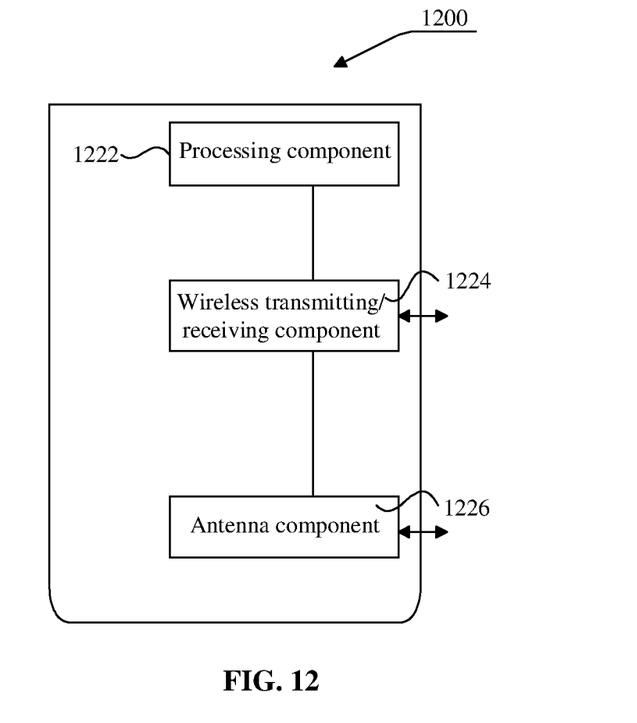
FIG. 12 is a schematic structural diagram illustrating a device for configuring a communication link according to an exemplary embodiment.

As illustrated in FIG. 12, FIG. 12 is a schematic structural diagram illustrating a method for configuring a communication link according to an exemplary embodiment. A device 1200 may be provided as a base station. Referring to FIG. 12, the device 1200 includes a processing component 1222, a wireless transmitting/receiving component 1224, an antenna component 1226, and a wireless interface-specific signal processing portion. The processing component 1222 may further include one or more processors.

One of the processors in the processing component 1222 may be configured to perform any of the method for configuring a communication link as described above.

The disclosure further provides a device for configuring a communication link. The device is applied to a terminal. The device includes:
a processor; and
a memory configured to store a processor-executable instruction, The processor is configured to:
receive capability enquiry signaling sent by a base station, the capability enquiry signaling being configured to enquire about a wireless transmission capability of the terminal;
generate first information according to the capability enquiry signaling, the first information being configured to represent the wireless transmission capability of the terminal; and
send capability reporting signaling carrying the first information to the base station, such that the base station configures a communication link for the terminal according to the first information.

Figure 13:
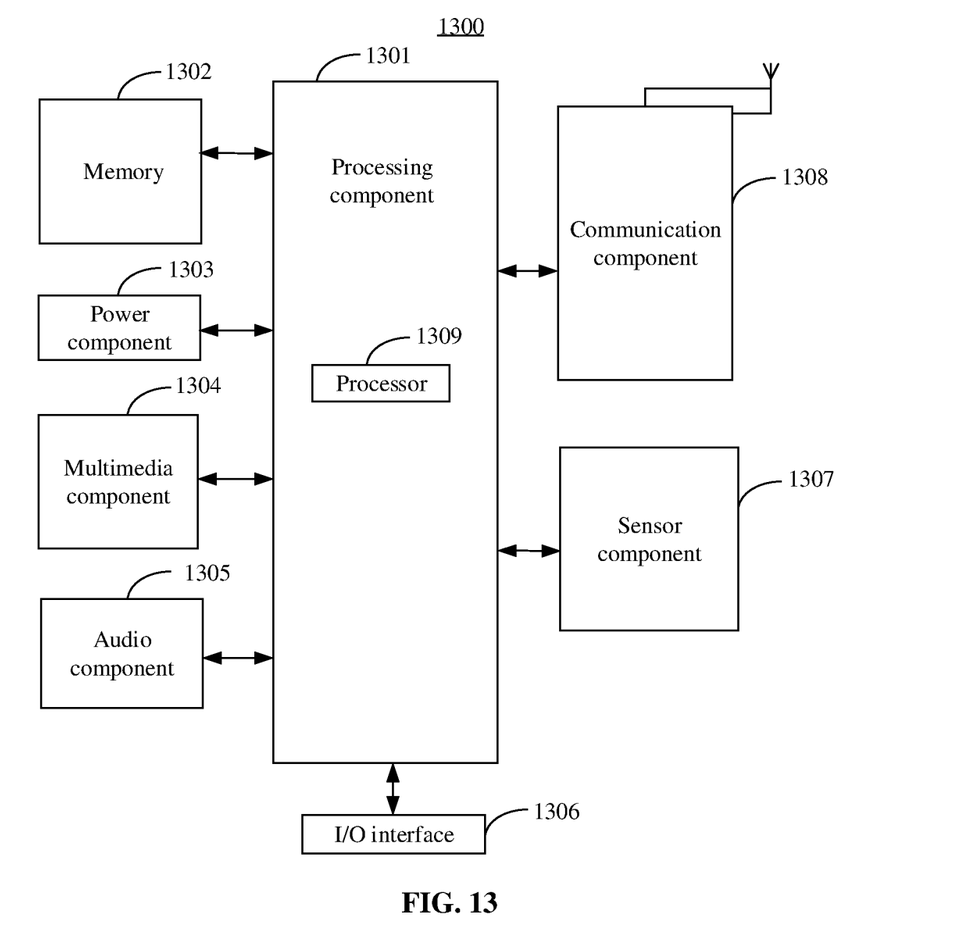
FIG. 13 is a schematic structural diagram illustrating a device for configuring a communication link according to an exemplary embodiment.

FIG. 13 is a schematic structural diagram illustrating a device for configuring a communication link according to an exemplary embodiment. FIG. 13 illustrates a device 1300 for configuring a communication link according to an exemplary embodiment. The device 1300 may be a terminal such as a computer, a mobile phone, a digital broadcast terminal, a messaging device, a gaming console, a tablet, a medical device, exercise equipment or a personal digital assistant.

Referring to FIG. 13, the device 1300 may include one or more of the following components: a processing component 1301, a memory 1302, a power component 1303, a multimedia component 1304, an audio component 1305, an Input/Output (I/O) interface 1306, a sensor component 1307, and a communication component 1308.

The processing component 1301 typically controls overall operations of the device 1300, such as operations associated with display, telephone calls, data communications, camera operations and recording operations. The processing component 1301 may include one or more processors 1309 to execute instructions to perform all or a part of the steps in the above described methods. Moreover, the processing component 1301 may further include one or more modules which facilitate interaction between the processing component 1301 and other components. For example, the processing component 1301 may include a multimedia module to facilitate interaction between the multimedia component 1304 and the processing component 1301.

The memory 1302 is configured to store various types of data to support the operation of the device 1300. Examples of such data include instructions for any applications or methods operated on the device 1300, contact data, phonebook data, messages, pictures, video, etc. The memory 1302 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 1303 provides power to various components of the device 1300. The power component 1303 may include a power management system, one or more power sources, and any other components associated with the generation, management and distribution of power in the device 1300.

The multimedia component 1304 includes a screen providing an output interface between the device 1300 and the user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 1304 includes a front camera and/or a rear camera. The front camera and/or the rear camera may receive an external multimedia datum while the device 1300 is in an operation mode, such as a photographing mode or a video mode. Each of the front camera and the rear camera may be a fixed optical lens system or have focus and optical zoom capability.

The audio component 1305 is configured to output and/or input audio signals. For example, the audio component 1305 includes a Microphone (MIC) configured to receive an external audio signal when the device 1300 is in an operation mode, such as a call mode, a recording mode, and a voice recognition mode. The received audio signal may be further stored in the memory 1302 or transmitted via the communication component 1308. In some embodiments, the audio component 1305 further includes a speaker to output audio signals.

The I/O interface 1306 provides an interface between the processing component 1301 and peripheral interface modules, such as a keyboard, a click wheel, or buttons. The buttons may include, but are not limited to, a home button, a volume button, a starting button, and a locking button.

The sensor component 1307 includes one or more sensors to provide status assessments of various aspects of the device 1300. For example, the sensor component 1307 may detect an open/closed status of the device 1300, and relative positioning of components. For example, the component is the display and the keypad of the device 1300. The sensor component 1307 may also detect a change in position of the device 1300 or a component of the device 1300, a presence or absence of user contact with the device 1300, an orientation or an acceleration/deceleration of the device 1300, and a change in temperature of the device 1300. The sensor component 1307 may include a proximity sensor configured to detect the presence of nearby objects without any physical contact. The sensor component 1307 may also include a light sensor, such as a Complementary Metal Oxide Semiconductor (CMOS) or Charge Coupled Device (CCD) image sensor, for use in imaging applications. In some embodiments, the sensor component 1307 may also include an acceleration sensor, a gyroscope sensor, a magnetic sensor, a pressure sensor, or a temperature sensor.

The communication component 1308 is configured to facilitate wire or wireless communication between the device 1300 and other devices. The device 1300 may access a wireless network based on a communication standard, such as WiFi, 2G or 3G, or a combination thereof. In one exemplary embodiment, the communication component 1308 receives a broadcast signal or broadcast associated information from an external broadcast management system via a broadcast channel In one exemplary embodiment, the communication component 1308 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the device 1300 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In exemplary embodiments, a non-transitory computer-readable storage medium including instructions is further provided, such as the memory 1302 including instructions. The above instructions may be executable by the processor 1309 of the device 1300 to implement the above described methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

When the instructions in the storage medium are executed by the processor, the device 1300 is enabled to perform any of the methods for configuring a communication link as described above.

Other implementation solutions of the present disclosure will be apparent to those skilled in the art from consideration of the specification and practice of the present disclosure. This present application is intended to cover any variations, uses, or adaptations of the present disclosure conforming to the general principles thereof and including such departures from the present disclosure as come within known or customary practice in the art. The specification and embodiments are exemplary, and a true scope and spirit of the present disclosure are indicated by the following claims.

It will be appreciated that the present disclosure is not limited to the exact construction that has been described above and illustrated in the accompanying drawings, and that various modifications and changes may be made without departing from the scope of the present disclosure. It is intended that the scope of the present disclosure is only limited by the appended claims.

What is claimed is:

1. A method for configuring a communication link, applied to a base station, the method comprising:
sending capability enquiry signaling to a terminal, wherein the capability enquiry signaling is configured to enquire about a wireless transmission capability of the terminal;
receiving capability reporting signaling sent by the terminal, wherein the capability reporting signaling comprises first information for representing the wireless transmission capability of the terminal; and
configuring a communication link for the terminal according to the first information, wherein the configuring comprises:
in response to determining, according to the first information, that the terminal does not support a first band combination and a channel combination corresponding to the first band combination does not comprise a channel combination supportable by the terminal, determining that the first band combination is not a communication link used by the terminal for simultaneous data transmission;

in response to determining, according to the first information, that the terminal does not support a second band combination while a channel combination corresponding to the second band combination comprises a channel combination supportable by the terminal, determining the supportable channel combination as a communication link used by the terminal for simultaneous data transmission; and in response to determining, according to the first information, that the terminal supports a third band combination, determining the third band combination as a communication link used by the terminal for simultaneous data transmission.

2. The method according to claim 1, wherein the first information comprises all band combinations and/or all channel combinations, each of which is supportable by the terminal and does not cause intermodulation distortion.

3. The method according to claim 1, wherein before the sending the capability enquiry signaling to the terminal, the method further comprises:

generating second information, wherein the second information is configured to represent one or more designated wireless transmission capabilities of the terminal enquired by the base station; and adding the second information into the capability enquiry signaling.

4. The method according to claim 3, wherein the designated wireless transmission capabilities comprise at least one designated band combination and/or at least one designated channel combination.

5. The method according to claim 3, wherein the first information comprises at least one band combination and/or at least one channel combination corresponding to the designated wireless transmission capabilities, respectively, the at least one band combination and/or the at least one channel combination being each supportable by the terminal and causing no intermodulation distortion.

6. A method for configuring a communication link, applied to a terminal, the method comprising:

receiving capability enquiry signaling sent by a base station, wherein the capability enquiry signaling is configured to enquire about a wireless transmission capability of the terminal;

generating first information according to the capability enquiry signaling, wherein the first information is configured to represent the wireless transmission capability of the terminal; and sending capability reporting signaling carrying the first information to the base station, wherein:

when the first information represents that the terminal does not support a first band combination and a channel combination corresponding to the first band combination does not comprise a channel combination supportable by the terminal, the capability reporting signaling is configured to cause the base station to determine that the first band combination is not a communication link used by the terminal for simultaneous data transmission;

when the first information represents that the terminal does not support a second band combination while a channel combination corresponding to the second band combination comprises a channel combination supportable by the terminal, the capability reporting signaling is configured to cause the base station to determine the supportable channel combination as a communication link used by the terminal for simultaneous data transmission; and when the first information represents that the terminal supports a third band combination, the capability reporting signaling is configured to cause the base station to determine the third band combination as a communication link used by the terminal for simultaneous data transmission.

7. The method according to claim 6, wherein the first information comprises all band combinations or all channel combinations, each of which is supportable by the terminal and does not cause intermodulation distortion.

8. The method according to claim 6, wherein the capability enquiry signaling comprises second information, wherein the second information is configured to represent one or more designated wireless transmission capabilities of the terminal enquired by the base station, the generating first information according to the capability enquiry signaling comprises:

generating the first information according to the second information, the first information comprising at least one band combination and/or at least one channel combination corresponding to the designated wireless transmission capabilities, respectively, the at least one band combination and/or the at least one channel combination being each supportable by the terminal and causing no intermodulation distortion.

9. The method according to claim 8, wherein the designated wireless transmission capabilities comprise at least one designated band combination and/or at least one designated channel combination.

10. A base station, comprising:

a processor; and a wireless transmitting/receiving component coupled to the processor, wherein the processor is configured to:

send, through the wireless transmitting/receiving component, capability enquiry signaling to a terminal, wherein the capability enquiry signaling is configured to enquire about a wireless transmission capability of the terminal;

receive, through the wireless transmitting/receiving component, capability reporting signaling sent by the terminal, wherein the capability reporting signaling comprises first information for representing the wireless transmission capability of the terminal; and configure a communication link for the terminal according to the first information, wherein in configuring the communication link, the processor is further configured to:

in response to determining, according to the first information, that the terminal does not support a first band combination and a channel combination corresponding to the first band combination does not comprise a channel combination supportable by the terminal, determine that the first band combination is not a communication link used by the terminal for simultaneous data transmission;

in response to determining, according to the first information, that the terminal does not support a second band combination while a channel combination corresponding to the second band combination comprises a channel combination supportable by the terminal, determine the supportable channel combination as a communication link used by the terminal for simultaneous data transmission; and in response to determining, according to the first information, that the terminal supports a third band combination, determine the third band combination as a communication link used by the terminal for simultaneous data transmission.

11. The base station according to claim 10, wherein the first information comprises all band combinations and/or all channel combinations, each of which is supportable by the terminal and does not cause intermodulation distortion.

12. The base station according to claim 10, wherein the processor is further configured to:
generate second information, wherein the second information is configured to represent one or more designated wireless transmission capabilities of the terminal enquired by the base station;
add the second information into the capability enquiry signaling; and
send, through the wireless transmitting/receiving component, the capability enquiry signaling carrying the second information to the terminal.

13. The base station according to claim 12, wherein the designated wireless transmission capabilities comprise at least one designated band combination and/or at least one designated channel combination.

14. The base station according to claim 12, wherein the first information comprises at least one band combination and/or at least one channel combination corresponding to the designated wireless transmission capabilities, respectively, the at least one band combination and/or the at least one channel combination being each supportable by the terminal and causing no intermodulation distortion.

15. A terminal, comprising:
a processor;
a communication component coupled to the processor; and
a memory storing instructions executable by the processor,
wherein the processor is configured to:
receive, through the communication component, capability enquiry signaling sent by a base station, wherein the capability enquiry signaling is configured to enquire about a wireless transmission capability of the terminal;
generate first information according to the capability enquiry signaling, wherein the first information is configured to represent the wireless transmission capability of the terminal; and
send, through the communication component, capability reporting signaling carrying the first information to the base station, wherein:

when the first information represents that the terminal does not support a first band combination and a channel combination corresponding to the first band combination does not comprise a channel combination supportable by the terminal, the capability reporting signaling is configured to cause the base station to determine that the first band combination is not a communication link used by the terminal for simultaneous data transmission;
when the first information represents that the terminal does not support a second band combination while a channel combination corresponding to the second band combination comprises a channel combination supportable by the terminal, the capability reporting signaling is configured to cause the base station to determine the supportable channel combination as a communication link used by the terminal for simultaneous data transmission; and
when the first information represents that the terminal supports a third band combination, the capability reporting signaling is configured to cause the base station to determine the third band combination as a communication link used by the terminal for simultaneous data transmission.

16. The terminal according to claim 15, wherein the first information comprises all band combinations and/or all channel combinations, each of which is supportable by the terminal and do not cause intermodulation distortion.

17. The terminal according to claim 15, wherein the capability enquiry signaling comprises second information, wherein the second information is configured to represent one or more designated wireless transmission capabilities of the terminal enquired by the base station, and the processor is further configured to:
generate the first information according to the second information, the first information comprising at least one band combination and/or at least one channel combination corresponding to the designated wireless transmission capabilities, respectively, the at least one band combination and/or the at least one channel combination being each supportable by the terminal and causing no intermodulation distortion.

18. The terminal according to claim 17, wherein the designated wireless transmission capabilities comprise at least one designated band combination and/or at least one designated channel combination.

* * * * *